Figure 1:
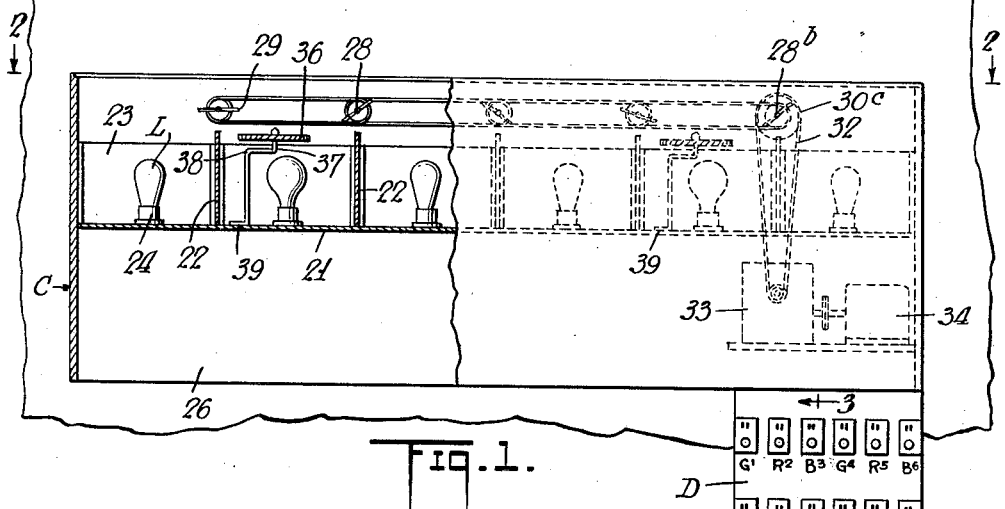

Sept. 18, 1934.  J. W. SHAW  1,973,858
DECORATIVE ILLUMINATION
Filed March 19, 1931   5 Sheets-Sheet 1

INVENTOR
John W. Shaw
BY
his ATTORNEYS

Sept. 18, 1934.　　　　J. W. SHAW　　　　1,973,858
DECORATIVE ILLUMINATION
Filed March 19, 1931　　5 Sheets-Sheet 2
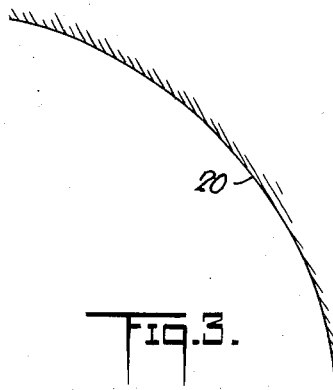
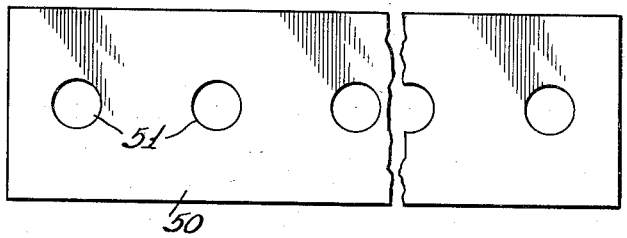
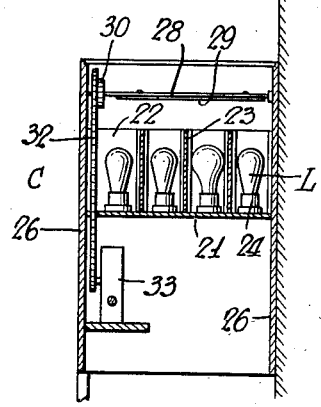
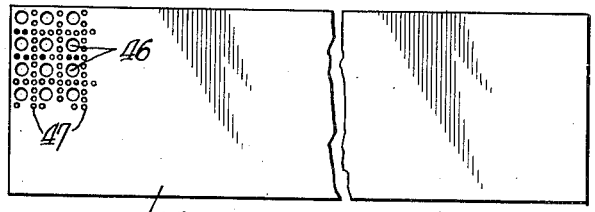
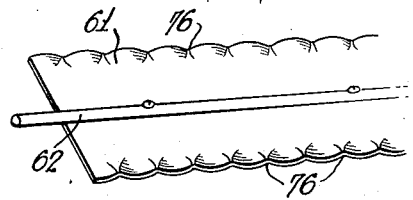
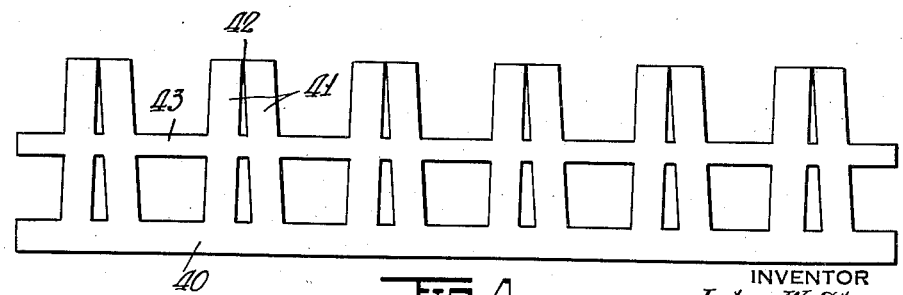
INVENTOR
John W. Shaw
BY
his ATTORNEYS Sept. 18, 1934.  J. W. SHAW  1,973,858
DECORATIVE ILLUMINATION
Filed March 19, 1931  5 Sheets-Sheet 3
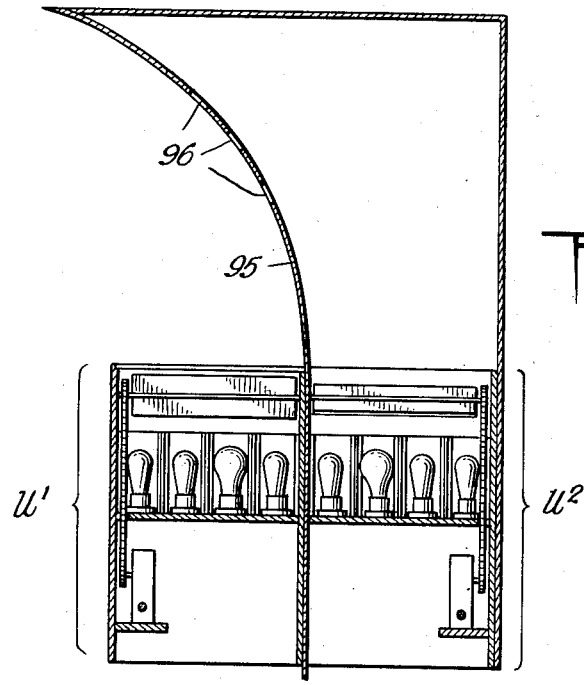
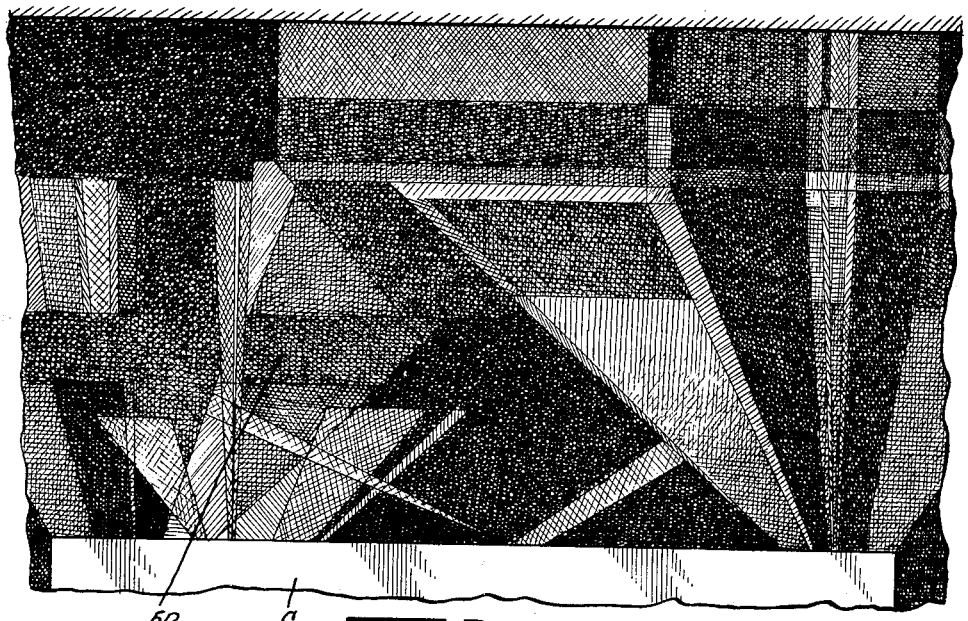
INVENTOR
John W. Shaw
BY
his ATTORNEYS Sept. 18, 1934.  J. W. SHAW  1,973,858
DECORATIVE ILLUMINATION
Filed March 19, 1931  5 Sheets-Sheet 4

INVENTOR
John W. Shaw
BY
his ATTORNEYS

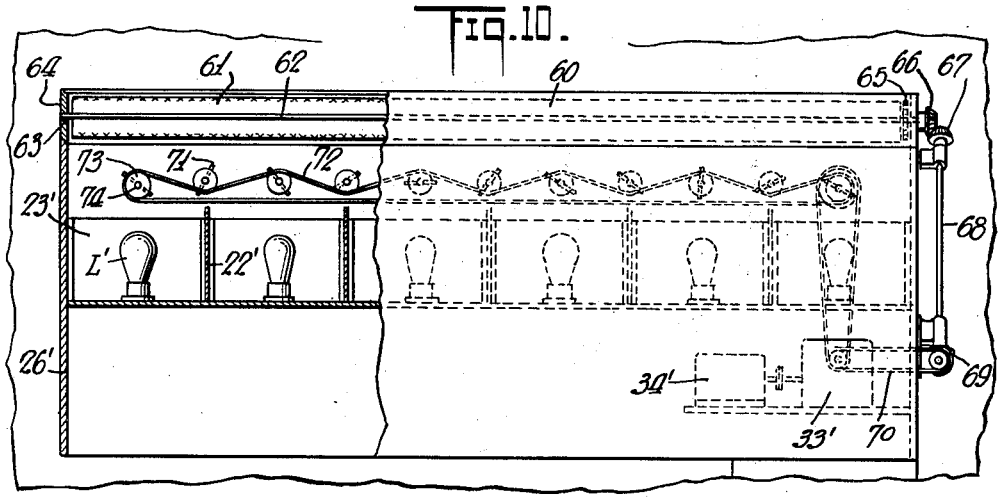
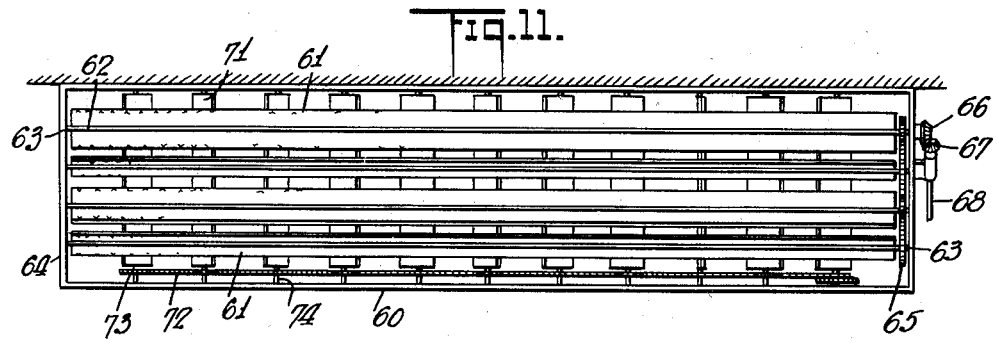
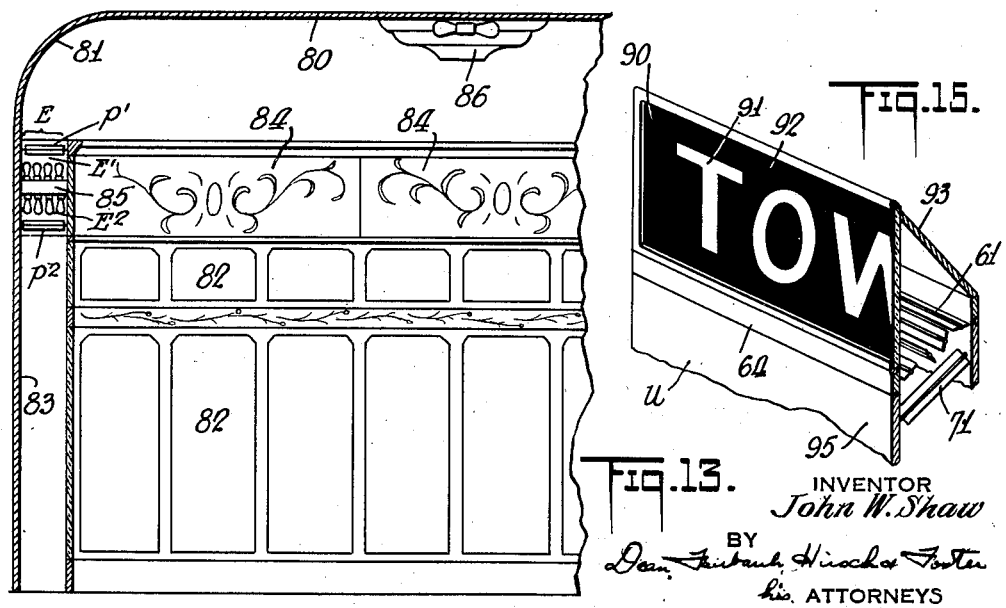

Patented Sept. 18, 1934

1,973,858

UNITED STATES PATENT OFFICE 1,973,858

DECORATIVE ILLUMINATION

John W. Shaw, Norwood, N. J., assignor to Bing & Bing, Inc., New York, N. Y., a corporation of New York Application March 19, 1931, Serial No. 523,674

9 Claims. (Cl. 240—9)

My present invention relates to decorative lighting, more especially for ballrooms, convention halls, theaters and other auditoriums, but is applicable for exterior regular or festive illumination of buildings, pageants, floats and the like, and is also useful in other relations as, for instance, in the illumination of reception rooms and living rooms of dwellings and in specialized applications to advertising display signs and the like.

An object of the invention is to produce continuously changing or modulated lighting effects of striking beauty and infinite variety, by the use of simple expedients, readily installed without particular reorganization in the architecture of the structure to be illuminated, and more specifically, to accomplish beautiful compound coloring effects upon conventional walls, ceilings, panels, copings, and upon other objects or surfaces, by the use of light and without resort to lenses, prisms or compound color screens.

Among other objects are to provide illuminating equipment of the above type, relatively economical in power consumption, the pattern control of which shall be readily replaceable, to produce any of a variety of different arbitrary effects, or, if desired, peculiar symbolic effects appropriate for particular functions, or occasions of use, and the operation of which shall be easy to control.

Other objects will be in part obvious, and in part pointed out hereinafter.

A feature of the invention is the interposition of preferably concealed light interceptors in the path of distributed sources, preferably of variously colored lights, thereby to produce penumbral compound color patterns upon the surface to be illuminated, the background for which patterns is illuminated by compound color of shades contrasting therewith.

The light interceptors may have any of a wide variety of different forms, including opaque units of reflecting or non-reflecting surface, or selective transmitters, and such interceptors may be fixed, or moving relative to the light sources, but in the preferred application, the lights or lamps are in fixed position, and a plurality of sets of interceptors altering their effectiveness by different movements, are simultaneously used either alone or one or more of said moving interceptor sets is used in combination with an additional fixed interceptor. By this arrangement, the shape and size of the penumbral area may be continually changed, as also the color of each region thereof, and the effectiveness is further enhanced by continual change in the relative intensity of the differently colored light sources.

Among numerous desirable specific instrumentalities for accomplishing the purposes of the invention, are the use of preferably a system of opaque vanes or blades, rotated preferably continuously to cut off or intercept changing areas of light from the sources. The vanes or blades may be driven from a common source of power, at the same or at different angular speeds, and are preferably maintained out of phase with each other for continual variation in effect.

The interceptors set forth may be operated longitudinally of or at right angles to the surface to be decorated, but preferably in two sets or systems, one longitudinal and the other transverse. For instance, two sets of interceptor vanes or blades may be used, and simultaneously rotated, respectively about longitudinal transverse axes. Some of these interceptors may be non-reflecting and others light reflectors, for further variations in effect.

Among other instrumentalities for carrying out the purposes of the invention, is the use of fixed shadow patterns across the path of dissipation from the sources of colored light, which patterns may be used alone but preferably instead of one of the two or more sets of moving interceptors, thereby to produce a decorative illuminating effect in which certain outlines remain geometrically fixed though they continually change in the distribution of color thereon and the remainder of the illuminated area is continually changing, both in outline and in color.

Another feature is the use of the fixed shadow pattern in the form of pattern plates, removably positioned adjacent the moving interceptor system for ready replacement by other fixed shadow pattern plates of different designs.

Another feature is the correlation of the lamps, and the various interceptor systems, movable and/or fixed together with the operating means thereof in an elongated compartment unit adapted to be installed in proper correlation with the wall, panel, ceiling or other surface to be decoratively illuminated.

Another feature is the simultaneous illumination of one and the same area from two or more of the composite equipments set forth, mounted, for instance, at opposite faces of the wall to be decorated, said wall having limited transparent or translucent areas.

Another feature is the application of the invention to display signs, by casting from the rear, the continually varying color effect above suggested, upon transparent or translucent outlines in an otherwise opaque panel.

Figure 2:
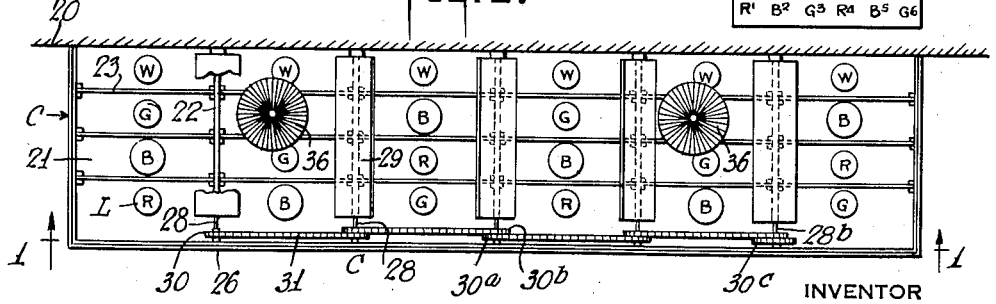
Figure 8:
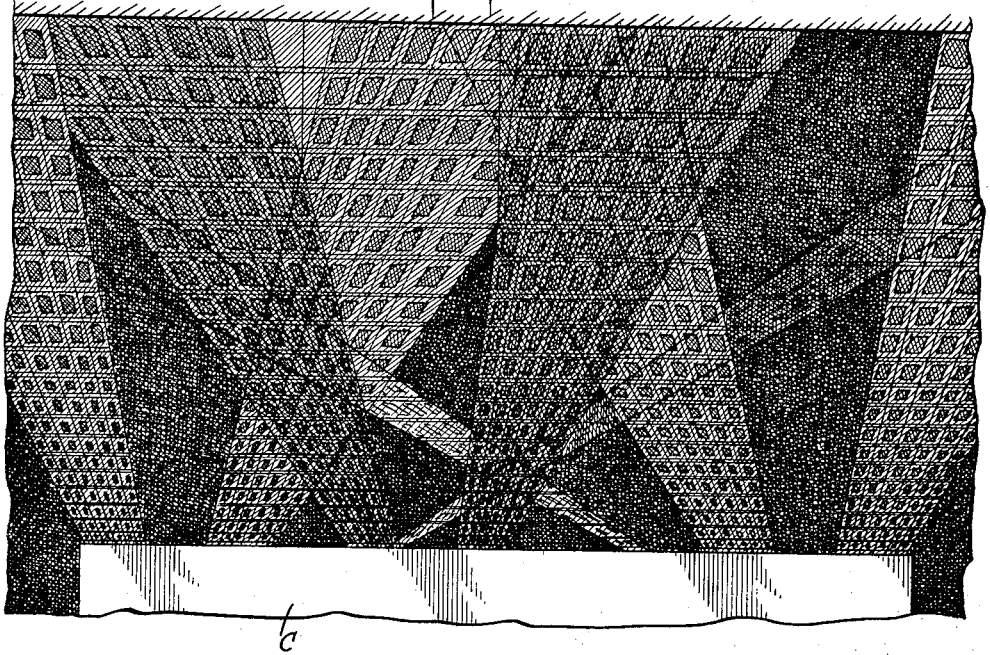
Figure 9:
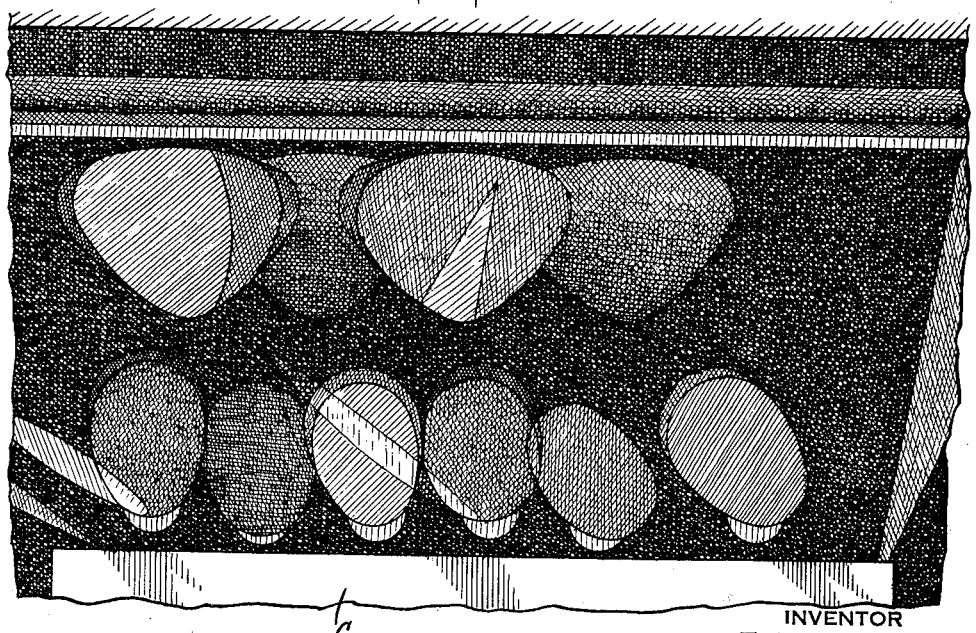

In the accompanying drawings in which are shown one or more of various possible embodiments of the several features of the invention, Fig. 1 is a view in longitudinal cross-section, more or less diagrammatic of one form of installation, Fig. 2 is a view in transverse section taken along line 2—2 of Fig. 1, Fig. 3 is a view in vertical section taken along line 3—3 of Fig. 1, Fig. 4 is a plan view of one illustrative construction of fixed shadow pattern plate, Figs. 5 and 6 are views similar to Fig. 4 of alternative constructions of shadow pattern plates, Figs. 7, 8 and 9 are views suggesting the results accomplished by the use of the shadow pattern plates of Figs. 4, 5 and 6 respectively, Fig. 10 is a view in longitudinal cross-section of an alternative embodiment of equipment, Fig. 11 is a plan view of the equipment of Fig. 10, Fig. 12 is a fragmentary detail showing the structure of one of the vanes, Fig. 13 is a view in longitudinal cross-section showing a special application of the decorative illuminating principle to a particular room, Fig. 14 is a view in transverse cross section through a wall of another application of the illuminating system, and Fig. 15 is a fragmentary perspective view illustrating the application of the invention to a display sign.

Referring now to Figs. 1, 2 and 3 of the drawings, there is illustratively shown a cove 20, which may be a balcony cove or ceiling cove, for instance, below which is mounted a compartment unit C containing the source of illumination and the modulating instrumentalities.

The compartment may be of wood, sheet metal or the like, and harmonizes in finish and form with the room and extends lengthwise of the cove. The unit may have a base plate 21 and a plurality of transverse partitions 22 determining compartments, each of which, in turn, if desired, may be subdivided by longitudinal partitions 23 to determine preferably four rectangular subcompartments, each of which has a lamp socket 24 for mounting an individual incandescent electric lamp L, the tops of which are approximately flush with the upper edges of walls 23. The lamps in each transverse set of compartments are of distinguishing color, preferably of the primary colors, red, blue and green (designated respectively R, B and G) and a white lamp (designated W) may be disposed in the fourth compartment. The various lamps are preferably selectively under control of theatre dimmers or equivalent control appliances, diagrammatically indicated at D.

The front and back walls 26 of the compartment extend well above the tops of the partitions 23 and mount some or all of the moving light interceptor system. In the illustrated embodiment shown, there are journalled in the front and back walls 26 of the compartment unit, a series of horizontal axles 28, each illustratively aligned directly above a transverse partition 23 and each mounting a vane 29 fixed thereto. Sprocket wheels 30 are affixed at the ends of the respective axles 28 and are connected by sprocket chains 31. Each of the intermediate axles illustratively has two sprocket wheels as 30a and 30b, one coacting with the chain of the preceding axle and the other with the chain of the succeeding axle. The extreme axle 28b has an additional sprocket wheel 30c coacting with sprocket chain 32 driven from a speed reduction case 33, which is in turn, operated by an electric motor 34, preferably below the floor board 21 of the unit, the walls of which preferably extend below said floor board, as shown. The vanes 29 are illustratively shown rectangular, but they may be triangular, circular, curvilinear, helical or of any desired shape, each producing a characteristic effect. As is best shown in Fig. 1, the vanes are out of phase with respect to each other although, if desired, they might be connected to operate in phase, and vanes of divers shapes may be concurrently used.

In addition to the vanes 29 on horizontal axles, the present embodiment also shows pin-wheel vanes 36, illustratively mounted on vertical bearing supports 37 and directly above certain of the lamps L. In the embodiment illustratively shown, the mount is offset as at 38 to clear the lamp, and its lower end is affixed at 39 to the floorboard. The pin-wheel vanes may be thus driven by heat radiation, each from the lamp directly therebelow.

At the top of the compartment, preferably as covers, there may be removably mounted any of a wide variety of fixed pattern plates, three of which are illustratively shown respectively in Figs. 4, 5 and 6. These pattern plates may be designed according to whim or fancy.

Fig. 4, for instance, indicates a truss like effect comprising a base bar 40, and sets of upstanding pairs of struts 41 slightly inclined toward each other and meeting at 42 and a longitudinal bar 43 midway between the tops and bottoms of the struts.

Fig. 5 shows a pattern plate 45 having a series of circular apertures 46 equidistant longitudinally and transversely, each framed by smaller apertures 47 along equidistant horizontal and vertical lines.

Fig. 6 shows a pattern plate 50 having illustratively only a series of aligned circular openings 51.

Obviously the equipment need not be preassembled into the self-contained unit described and preferred, but it may be built up in place and, if desired, in a countersink or corresponding groove in the wall structure of the room or auditorium, so as not to protrude to the degree shown in the drawings.

The invention is not limited to disposing the compartments or lamps in a horizontal row, as shown, but they may be arranged vertically to illuminate a column or pilaster, a panel or other upright building structure. The device may also, if desired, be disposed along the ceiling to cast the decorative illumination either along the ceiling surface or along a panel of the ceiling. In ordinary practice, the illuminating equipment compartments would be arranged about the entire auditorium in one or more tiers near the ceiling, balcony, etc. as desired.

In use, the lamps L are illuminated, and the motor 34 is operated to turn the vanes 29 and one of the fixed shadow pattern plates of Figs. 4, 5 or 6 for instance, is laid as a cover on the illuminating box. At the same time the theatre dimmer D may be operated either automatically or by hand control to vary the relative candle powers of the various colored lamps L.

It is difficult to describe in words or to depict on the drawings, the color effects and variations produced. With the shadow pattern plate of Fig.

4, for instance, a fixed base shadow pattern generally indicated at 52 in Fig. 7 appears upon the wall or other screen. Said shadow results from the interception of light from the respective lamps directly in its path. The other lamps, however, by lateral diffusion cast illumination upon the shadow area, producing a compound penumbral effect of color continually changing as lamp dimmer D is operated. Simultaneously therewith the rotating vanes 29 produce variable areas of rich compound color, moving across the more or less fixed outline of the penumbra 52, and these effects are, in turn, crossed or intersected by the radiating color lines due to the moving shadows produced by the pin-wheels 36. Due to the continual change and the difference in phase between the moving vanes, and the variations in the gradations of color of the lamps, beautiful and interesting changes in color and design are displayed with continual change of infinite variety.

The color design is characterized by the absence of geometrical precision, suggesting changing landscapes, marine views, conflagrations, sunsets and the like, in interesting and startling variety, rendered intriguing by the more or less fixed pattern outline, with ever-changing and moving colors thereon, with the superposed contrasting movable color design of the background.

In a similar manner Fig. 8 crudely suggests the effect produced by the use of the shadow pattern plate of Fig. 5, creating the illusion of colored skyscrapers viewed from an airplane, with a continual change of searchlight or sunlight illumination thereon.

Fig. 9 suggests the use of the simple pattern plate of Fig. 6 producing illuminated images in the shape of eggs over which travel continually changing color patterns and suggesting an arrangement suitable, for instance, for an Easter celebration.

The foregoing illustrative examples are merely suggestive of the infinite variety of design and color effects appropriate to any occasion with or without symbolism which those skilled in the art could readily produce by appropriate choice of movable and fixed light interceptor systems.

It is, of course, understood that while the invention in one preferred and interesting application embodies the use of colored lamps continually changed in relative intensity, in combination with a fixed light interceptor pattern, in addition to a movable and preferably a variety of moving interceptors, such as vanes or pin-wheels, the invention in its broader aspects may be carried out with the omission of one or more of such elements.

In Figs. 10 and 11 is shown an alternative embodiment of decorative illuminating equipment, in which, instead of the removable fixed shadow pattern plate, there is employed a cover frame 60 having movable light-modulating means, illustratively shown as a series of vanes 61 longitudinally of the frame, each mounted on a unitary axle 62 journalled as at 63 in the end walls 64 of the frame. Preferably the ends of the axles have inter-meshed gears 65 driven from a miter gear 66 at the outer end of one of the axles 63 and operated from the coacting miter gear 67 on a shaft 68 in turn, driven through miter gears 69 operated by means of a sprocket chain connection 70 from the reduction mechanism 33', correspondingly designated in Fig. 1 and connected as in Fig. 1, to drive a system of transverse vanes.

In the embodiment of Fig. 10, the vertical heat motor-operated pin-wheels of Fig. 1 are preferably eliminated and the transverse vanes 71 are more numerous, being preferably equi-distantly spaced, one over each lamp partition 22', and one over each transverse row of lamps L'. A single sprocket chain 72 has one of its runs threaded alternately over and under the successive sprocket wheels 73 on the ends of the vane axles 74, as shown, so that the alternate vanes are rotated in opposite directions, which produces further variety of effect.

It is desirable to color the various vanes 71 black and similarly to blacken the partition walls 22' and 23' of the compartment, as well as the inner faces of the outer walls 26' thereof. The black walls and vanes being non-reflecting, the primary colors from the lamps are projected and compounded upon the screen, producing a particularly rich color effect.

The longitudinal vanes 61 are in this instance, shown of polished metal foil, which reflect substantially all of the light cast upon them.

The black and reflecting interceptors may be distributed in any of numerous possible ways, in the equipment, and some or all of the interceptors may be partly translucent, for further variety in effect. As best shown in Fig. 12, the edges of the longitudinal vanes 61 are scalloped or made in wave-like form as at 76.

With the use of the equipment of Figs. 10, 11 and 12, the vanes 61 and 71 being concurrently driven as from the motor 34' through the reduction gearing unit 33', the effect produced upon the screen is especially beautiful in the color, the outline and the continual mobility and modulation of both due to the changing compound color effects consequent upon the continual variations in the relative positions of the light intercepting transverse vanes 71 and the intercepting and reflecting longitudinal vanes 61. There is the additional effect due to the continual change in the relative candle powers of the lamps L' of different colors, which may be produced either automatically or by manual control.

The serrated, scalloped or wavy outlines at 76 on the longitudinal vanes 61 produce upon the wall or screen, brilliant wavy conformations simulating the shimmer of a river or other body of moving water in the sunlight and these wavy effects travel, those due to one edge of the vane upward and those due to the opposite edge, downward, which further enhances the effect of continual mobility.

It is, of course, understood that when the frame 60 is used alone or with the transverse vanes 71, fixed shadow patterns, such as those of Figs. 4, 5 or 6 may be superposed and the variety of effects produced may be enhanced almost without limit.

It is, of course, understood that in each of the embodiments, the moving interceptors might have driving sprocket wheels of different diameters, so that they revolve or move at different angular speeds to produce further variety in the results.

It is also apparent that instead of or in addition to the vanes, a moving screen with different designs thereon might be employed for further variations.

In Fig. 13 is shown a highly specialized application of the decorative lighting principle above described, as applied to a room, illustratively shown with a ceiling 80 having a cove 81, the walls having clear glass panels 82, said panels spaced from the structural wall 83 of the room, which latter wall preferably furnishes a flat white background. Immediately below the cove 81 of the ceiling, decorated panels 84 are illustratively provided, which are removable to afford access to the illuminating equipment E in the space between said panels and the structural wall.

The lighting unit may be identical or similar to any of those previously described, but is preferably in duplicate sets E' and E², with the lamps of one set upstanding and those of the others, extending downward, said sets mounted on a common support 85.

The illuminating equipment may extend peripherally about the entire room or along those walls thereof which are to be illuminated. The fixed shadow pattern plate of the general type shown in Figs. 4, 5 and 6 if used, may, if desired, be of one design as at P' at the top of the upper unit, and of another design as at P² at the bottom of the lower unit.

If desired, a ceiling fixture 86 may be employed to afford ordinary illumination at such time as the color effect is not to be used.

In Fig. 14 is shown a modification in which one of the decorative lighting equipments U' is disposed at the front face of the wall and another preferably similar equipment U² at the rear face of the wall, illustratively presenting a cove 95 above both said equipments. The wall has cut out or translucent characters, letters or designs represented cross-sectionally by apertures 96. In operation, the cut-out area or design 96 is illuminated from the rear equipment U² and said cut-out area, as well as the cove or wall area, in its entirety are simultaneously illuminated from the front equipment U'.

It being understood that the front and back equipments U' and U² are operated in uncoordinated and out of phase relation with respect to each other, the effect produced is a startling one of an illuminated design, with moving and changing color areas thereon, the outline of the design itself, however, remaining fixed and the area about the design furnishing a background of continually contrasting changing and mobile color.

In Fig. 15 is shown an application of the principle above described, to illuminated display signs for indoor or outdoor use. The sign in this instance comprises a vertical panel 90, which may be of glass or other transparent material and upon which are outlined the letters or characters or design 91, the background around such characters being rendered opaque by painting the same black as at 92.

An oblique reflecting screen 93 preferably of dull white and in back of the panel 90 is supported at its lower edge over the rear of the illuminating equipment unit U above the front 95 of which, panel 90 extends. Unit U may be on the principle of any of those above described, but is preferably substantially of the construction of that of Figs. 10, 11 and 12.

In operation, the characters or letters of the sign will appear with colored illumination continuously moving and changing, affording a most unique effect. The characters or designs 91 may be made as large or as small as desired, for the particular purpose in hand and the effect of the continual change of color and mobility is never reproduced, even though operation be continued for many hours at a time, which arouses the interest of spectators and thereby renders the sign especially effective for its intended purpose.

It will thus be seen that there is herein described, an installation, apparatus and method in which the several features of this invention are embodied, and which installation, apparatus and method in their action attain the various objects of the invention and are well suited to meet the requirements of practical use.

As many changes could be made in the above apparatus and method, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. A decorative lighting equipment comprising an elongated compartment having a floor board, lamps arranged therealong, a system of light interceptors movably positioned in said compartment, motor means for continuously moving said interceptors, a cover frame having movable light interceptors therein and transmission means for driving the latter simultaneously with the operation of the former.

2. Decorative illuminating equipment comprising a compartment having transverse axles thereacross with vanes thereon, longitudinal axles thereacross with vanes thereon, operating means for continually rotating said transverse and said longitudinal vanes, and a series of light sources in said compartment, the rays from which are partially intercepted by said moving vanes.

3. The combination set forth in claim 2 in which the transverse vanes are driven from a common source of power, some in clockwise and others in counterclockwise direction.

4. A decorative illuminating equipment comprising a compartment having lamps therein, the walls of said compartment being black, black obstructions across said compartment, means for continually moving said obstructions, reflecting means associated with said obstructions and means for continually changing the position of said reflecting means.

5. Decorative lighting equipment comprising a compartment having a plurality of lamps therein of different colors, metal plate reflectors across said compartment, said reflectors having irregularities therein, and means for continually moving said reflectors to continually modify the colored light effect upon a contiguous screen.

6. Decorative lighting equipment comprising a compartment having a plurality of lamps therein of various colors, transverse partitions extending substantially to the tops of said lamps, transverse axles across said compartment, a vane carried by each of said transverse axles, means for rotating said vanes simultaneously, each vane in a direction opposite to that of the next vane, axles extending longitudinally of the compartment out of the plane of said vanes, plates on said axles and means for simultaneously rotating said longitudinal axles.

7. A decorative lighting installation comprising a surface having a fixed translucent pattern thereon, decorative illuminating equipment in back of said surface and clear of said translucent area, decorative illuminating equipment in front of said surface and clear of said area, each of said equipments including sources of light of various colors arranged lengthwise of the surface, means for continuously changing in uncoordinated manners the color effect produced from said two equipments, said means including movable light intercepting elements coordinated with said respective lights to produce compound color effects both at said translucent pattern and on the surface of said screen.

8. A decorative lighting installation comprising a surface having a fixed, translucent pattern thereon, decorative illuminating equipment in back of said surface, clear of said translucent area and decorative illuminating equipment in front of said surface and clear of said area, each of said equipments including sources of light of various colors arranged lengthwise of the surface and means for continuously changing in uncoordinated manners the color effect produced from said two equipments, said means including movable light intercepting elements coordinated with said respective lights, producing compound color effects, both at said pattern and on the surface of said screen and means for varying in uncoordinated relation the relative candle powers of the lights of different colors of each of the lighting equipments.

9. Decorative illuminating equipment comprising a compartment having a series of lights arranged lengthwise of said compartment and in concealed position, an interceptor system in said compartment, means for displacing said interceptor system about a horizontal axis of control, a second interceptor system in said compartment and means for simultaneously displacing the latter at right angles to the plan of movement of said first system.

JOHN W. SHAW.